(12) United States Patent
Werner et al.

(10) Patent No.: US 8,573,345 B2
(45) Date of Patent: Nov. 5, 2013

(54) GROUND LEVEL SERVICING OF LARGE WORK VEHICLES

(75) Inventors: Gregory K. Werner, Durango, IA (US); Daniel J. Schuller, Dubuque, IA (US); John M. Chesterman, Dubuque, IA (US); Denis J. Montocchio, Dubuque, IA (US); Karl G. Heine, Dubuque, IA (US)

(73) Assignee: Deere & Company, Moline, IL (US)

( * ) Notice: Subject to any disclaimer, the term of this patent is extended or adjusted under 35 U.S.C. 154(b) by 248 days.

(21) Appl. No.: 13/027,928

(22) Filed: Feb. 15, 2011

(65) Prior Publication Data

US 2012/0205172 A1    Aug. 16, 2012

(51) Int. Cl.
*B62D 25/10*    (2006.01)

(52) U.S. Cl.
USPC ........................................ 180/69.24; 296/24.3

(58) Field of Classification Search
USPC ................ 180/69.2, 69.24; 296/24.3, 193.09, 296/193.1, 193.11
See application file for complete search history.

(56) References Cited

U.S. PATENT DOCUMENTS

| | | | |
|---|---|---|---|
| 2,769,501 A * | 11/1956 | Wagner | 180/69.2 |
| 2,833,364 A * | 5/1958 | Lee | 180/69.2 |
| 3,583,513 A * | 6/1971 | Macadam et al. | 180/69.24 |
| 4,415,052 A | 11/1983 | Gauer | |
| 4,921,062 A * | 5/1990 | Marlowe | 180/89.14 |
| 5,215,157 A * | 6/1993 | Teich | 180/69.24 |
| 6,810,979 B2 * | 11/2004 | Johansson et al. | 180/69.21 |
| 7,556,309 B2 * | 7/2009 | Ayabe | 296/193.11 |
| 7,578,365 B2 * | 8/2009 | Kurtz et al. | 180/69.2 |
| 7,591,334 B2 * | 9/2009 | Eckersley et al. | 180/69.24 |
| 2009/0230710 A1 * | 9/2009 | Cech et al. | 296/24.3 |

FOREIGN PATENT DOCUMENTS

DE    1020535    12/1957
EP    1873043    1/2008

OTHER PUBLICATIONS

Swedish PTO Office Action, dated Nov. 6, 2012 for related Application No. 1250126-8, with English translation.

* cited by examiner

*Primary Examiner* — John Walters

(74) *Attorney, Agent, or Firm* — Quarles & Brady LLP

(57) ABSTRACT

A work vehicle includes a chassis, an engine compartment and an engine. The engine compartment is carried by the chassis and defined by a plurality of upstanding walls, one of which includes an openable access panel. The engine is carried by the chassis and includes a plurality of service points positioned inside and adjacent to the access panel for servicing the engine by a person positioned outside the access panel.

16 Claims, 2 Drawing Sheets

GROUND LEVEL SERVICING OF LARGE WORK VEHICLES

FIELD OF THE INVENTION

The present invention relates to work vehicles, and, more particularly, to the servicing of large work vehicles.

BACKGROUND OF THE INVENTION

Large work machines require regular servicing at predetermined intervals, depending on the type of service required. For example, with regard to engine servicing, the engine oil is typically changed at 100 hours, the fuel filter may be changed at 200 hours, etc. Other types of servicing may be more random, such as cleaning the air filter (which may depend on the operating environment), jump starting the vehicle (which may depend on the age of the batteries, cold weather, etc.).

With large work machines, the engine is typically manufactured separate from the vehicle chassis and installed as a unit within the engine compartment of the vehicle. Typically the engine compartment is defined by an engine hood and/or multiple panels which open to provide access to the engine. The engine typically includes service points along different sides of the engine; thus, it is necessary to provide access to the engine from all sides of the engine compartment. With a large vehicle this often means climbing on top of the front tires or a ladder to open the hood and/or access panels to service the engine. This can be difficult and cumbersome at times. Moreover, it may be necessary to climb up and down on the tires or ladder to get and use the proper tools required for the servicing task. This can be inconvenient at best.

What is needed in the art is a work machine which is configured for easier servicing of the engine within the engine compartment.

SUMMARY

The present invention provides a work machine with an engine compartment having an access panel which opens along a single side, preferably the front. The engine is also configured with all service points along one side, and the service points are adjacent to the access panel such that all required service functions can be performed by an operator through the access panel.

The invention in one form is directed to a work vehicle including a chassis, an engine compartment and an engine. The engine compartment is carried by the chassis and defined by a plurality of upstanding walls, one of which includes an openable access panel. The engine is carried by the chassis and includes a plurality of service points positioned inside and adjacent to the access panel for servicing the engine by a person positioned outside the access panel.

The invention in another form is directed to a method of servicing a work vehicle, including the steps of: opening an access panel of an engine compartment carried by a chassis of the vehicle; accessing an engine in the engine compartment through the access panel, the engine having a plurality of service points associated with servicing of the engine, all of which are positioned along a single side of the engine adjacent to the access panel; and servicing the engine through the access panel at one or more of the plurality of service points.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiments of the invention, in one form, and such exemplification is not to be construed as limiting the scope of the invention in any manner.

DETAILED DESCRIPTION

Figure 1:
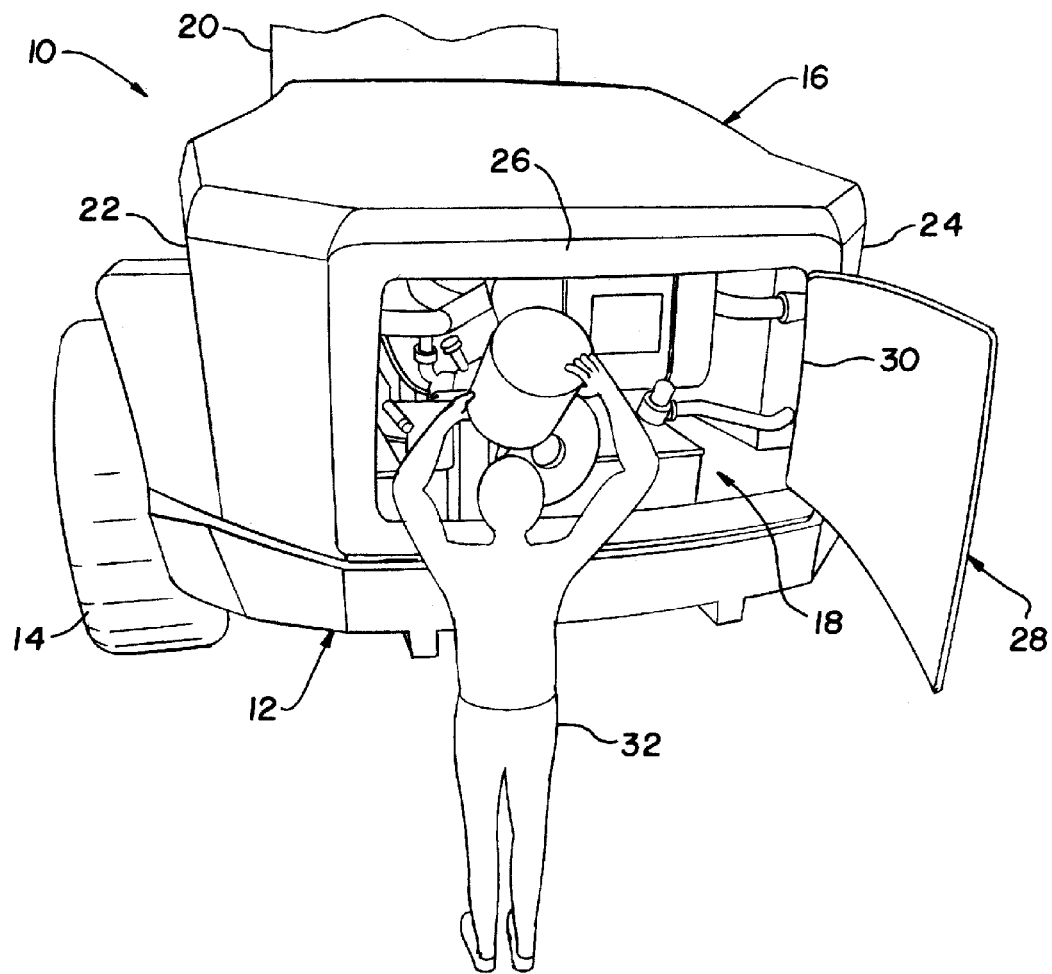
FIG. 1 is a front perspective view of an embodiment of a work vehicle of the present invention.

Referring now to the drawings, there is shown an embodiment of a work vehicle 10, which generally includes a chassis 12, wheels 14, engine compartment 16, and an engine 18 positioned within engine compartment 16. Work vehicle 10 is assumed to be an articulated dump truck in the illustrated embodiment, but could also be a different type of a work vehicle, such as an agricultural or forestry work vehicle. Chassis 12 generally includes a structural framework for vehicle 10, and has a plurality of interconnected frame members (not individually numbered), which are partially or entirely covered by a vehicle body. The vehicle body may include an operator cab 20, panels, fenders, etc. The vehicle body is also defined as including engine compartment 16.

Engine compartment 16 is carried by chassis 12 and defined by a plurality of upstanding walls 22, 24, and 26. Wall 26 defines a front wall of engine compartment 16, and includes an openable access panel 28, which is in the form of an air permeable grill, which hinges along a vertical side edge 30 to provide access to the interior of engine compartment 16, as an operator stands in front of work vehicle 10, to provide various service related tasks on engine 18.

Engine 18 is also carried by chassis 12 and includes a plurality of service points positioned inside and adjacent to access panel 28 for servicing engine 18 by a person/operator 32 positioned outside access panel 28. More particularly, engine 18 is configured with all service points located along a single side of engine 18, which is adjacent to access panel 28. The service points generally are related to oil, air, fuel, and electrical related service points. For example, the service points of engine 18 may include a fuel filter 34, a fuel primer 36, a severe duty fuel filter 38, an air filter 40, electrical jump start posts 42, an axle cooling manifold 44, a windshield washer fluid fill 46, an engine oil drain 48 (quick service only), an engine oil fill 50, an engine oil filter 52, a fuel fill 54, and an auxiliary drive belt (i.e., serpentine belt) 56.

Figure 2:
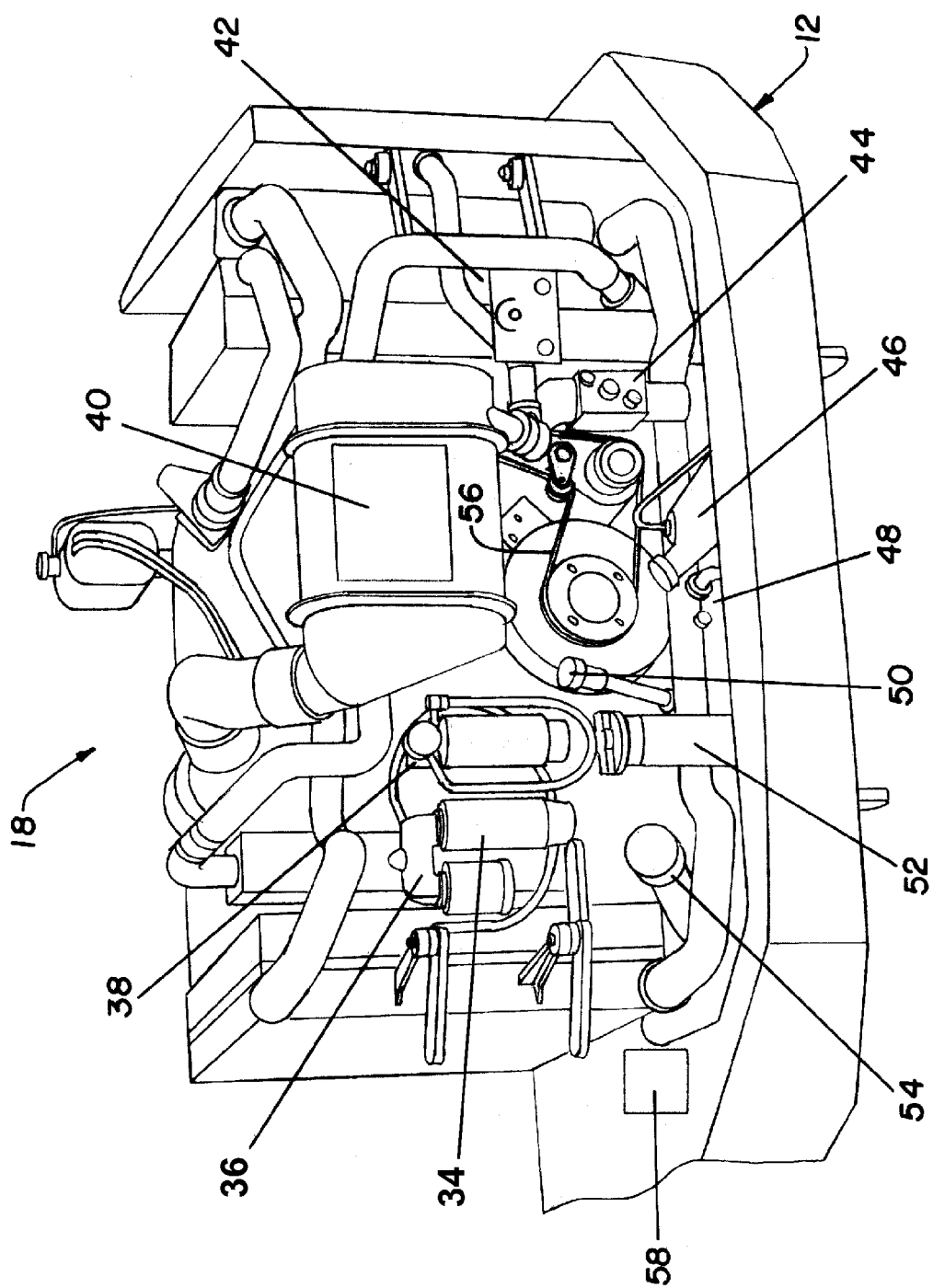
FIG. 2 is a perspective view of the engine within the vehicle of FIG. 1, illustrating various types of service points which are all accessible from the front of the work vehicle.

With the present invention, all service points for the engine are accessible through a single access panel while a person is standing on the ground (without requiring the use of a step or ladder). The above list of service points is not intended to be all-inclusive. Reference number 58 shown in FIG. 2 is intended to be a block or schematic representation of other possible service points located inside of and adjacent to access panel 28. For example, other types of service points (as represented by block 58) may include a fuel filter water bowl, an electrical isolator switch, an engine coolant drain (quick service only), engine coolant sampling port(s), engine oil sampling port(s), an engine oil level check, a front axle filter, and a front axle control valve. Other types of service points are also possible.

For servicing of engine 18 within engine compartment 16 of work vehicle 10, an operator 32 may simply open access panel 28 of front wall 26. Engine 18 may be accessed through access panel 28, with all of the different service points for engine 18 as described above being located inside of and adjacent to access panel 28. The various service functions can be carried out at the corresponding service points, as described above and shown in FIG. 2, while a person is standing on the ground.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A work vehicle, comprising:
    an articulating chassis;
    an engine compartment carried by said chassis and defined by a plurality of upstanding walls, one of said walls including an openable access panel located at a single side of said engine compartment; and
    an engine carried by said chassis and having a set of service points which are positioned inside said engine compartment between said access panel and said engine;
    wherein said service points provide all operator service functions for said engine, including service points for said engine associated with vehicle components located remotely from said engine compartment.

2. The work vehicle of claim 1, wherein said service points include each of oil, air, fuel and electrical related service points.

3. The work vehicle of claim 2, wherein said service points include:
    a fuel filter;
    a fuel primer;
    a severe duty fuel filter;
    a fuel filter water bowl;
    an air filter;
    an electrical isolator switch;
    electrical jump start posts;
    an engine quick service oil drain;
    an engine quick service coolant drain;
    at least one engine coolant sampling port;
    at least one engine oil sampling port;
    an engine oil level check;
    an engine oil fill;
    an engine oil filter;
    a fuel fill; and
    an auxiliary drive belt.

4. The work vehicle of claim 1, wherein said access panel is a front access panel.

5. The work vehicle of claim 1, wherein said access panel is an air permeable grill which hinges along a vertical side edge.

6. The work vehicle of claim 1, wherein said work vehicle is an articulated dump truck.

7. The work vehicle of claim 1, wherein one or more of said service points provide operator service functions for vehicle components other than said engine.

8. The work vehicle of claim 7, wherein the said one or more service points proving operator service functions for vehicle components other than said engine include:
    an axle cooling manifold;
    a front axle filter; and
    a front axle control valve.

9. A method of servicing a work vehicle, comprising the steps of:
    opening an access panel of an engine compartment carried by an articulating chassis of the vehicle, said access panel being located at a single side of said engine compartment;
    accessing an engine in the engine compartment through the access panel, said engine having a set of service points associated with servicing of said engine which are positioned inside said engine compartment between said engine and said access panel; and
    servicing the engine through the access panel at one or more of said plurality of service points;
    wherein said service points provide all operator service functions for said engine, including service points for said engine that are associated with vehicle components located remotely from said engine compartment.

10. The method of servicing a work vehicle of claim 9, wherein said service points include each of oil, air, fuel and electrical related service points.

11. The method of servicing a work vehicle of claim 10, wherein said service points include:
    a fuel filter;
    a fuel primer;
    a severe duty fuel filter;
    a fuel filter water bowl;
    an air filter;
    an electrical isolator switch;
    electrical jump start posts;
    an engine quick service oil drain;
    an engine quick service coolant drain;
    at least one engine coolant sampling port;
    at least one engine oil sampling port;
    an engine oil level check;
    an engine oil fill; an engine oil filter;
    a fuel fill; and
    an auxiliary drive belt.

12. The method of servicing a work vehicle of claim 9, wherein said access panel is a front access panel.

13. The method of servicing a work vehicle of claim 9, wherein said access panel is an air permeable grill which hinges along a vertical side edge.

14. The method of servicing a work vehicle of claim 9, wherein said work vehicle is an articulated dump truck.

15. The method of servicing a work vehicle of claim 9, wherein one or more of said service points provide operator service functions for vehicle components other than said engine.

16. The method of servicing a work vehicle of claim 15, wherein the said one or more service points proving operator service functions for vehicle components other than said engine include:
    an axle cooling manifold;
    a front axle filter; and
    a front axle control valve.

* * * * *